(12) United States Patent
Chang et al.

(10) Patent No.: US 7,128,466 B2
(45) Date of Patent: Oct. 31, 2006

(54) DUAL THERMOMETER SYSTEM

(75) Inventors: Chee Ann Chang, Hong Kong (CN); Kai Wai Wu, Hong Kong (CN); Wai Man Yuen, Hong Kong (CN)

(73) Assignee: Ewig Industries Co., Ltd., Hong Kong (CN)

( * ) Notice: Subject to any disclaimer, the term of this patent is extended or adjusted under 35 U.S.C. 154(b) by 384 days.

(21) Appl. No.: 10/191,098

(22) Filed: Jul. 8, 2002

(65) Prior Publication Data

US 2003/0007544 A1    Jan. 9, 2003

Related U.S. Application Data

(60) Provisional application No. 60/304,276, filed on Jul. 9, 2001.

(51) Int. Cl.
  *G01K 1/16*   (2006.01)
  *G01K 13/00*  (2006.01)
  *G01K 7/22*   (2006.01)

(52) U.S. Cl. .............. 374/141; 374/149; 374/208; 374/170; 374/185; 99/324

(58) Field of Classification Search .......... 374/141, 374/149, 179, 155, 208, 184–185, 187, 170, 374/183; 340/870.17, 870.04, 870.09, 870.01; 95/331, 324
See application file for complete search history.

(56) References Cited

U.S. PATENT DOCUMENTS 3,971,620 A * 7/1976 Everett ............... 359/430
4,183,248 A * 1/1980 West ................. 73/362 AR (Continued)

FOREIGN PATENT DOCUMENTS

JP    2001138834 A  *  5/2001

OTHER PUBLICATIONS

Polder dual sensor thermometer and timer. Copyright 1995-2003.*

(Continued)

*Primary Examiner*—Gail Verbitsky
(74) *Attorney, Agent, or Firm*—Lathrop & Gage LC

(57) ABSTRACT

The invention provides a dual thermometer system for the measurement and display of temperature data taken at two separate locations within an oven. In one aspect, the invention provides an elongated probe connected with a flexible electronic cable. The probe houses two temperature sensors—one for sensing internal food temperature, one for sensing inside oven air temperature. The sensors are space apart within the probe such that the one sensor can be positioned substantially within a food item and the other sensor can positioned substantially outside of the food item and within the oven. Signals from the sensors are relayed from the probe and through the cable; external electronics may attach to the cable to acquire the signals and display associated temperatures. In another aspect, signals from temperature sensors are relayed from the probe and through the cable to a first wireless termination. The first wireless termination wirelessly relays signals from the probe to a second wireless termination coupled to module electronics, to acquire the wireless signals and to display associated temperatures. In operation, the probe is inserted into food within an operating oven, such that one of the sensors senses food temperature and such that the other of the sensors senses oven air temperature; the cable extends from the probe and through the door of the oven; the module electronics may be attached to a convenient location in the kitchen, usually near to the oven, to display temperatures from the probe.

49 Claims, 4 Drawing Sheets

U.S. PATENT DOCUMENTS

| | | | |
|---|---|---|---|
| 4,348,870 A * | 9/1982 | Stein et al. | 62/140 |
| 4,707,588 A * | 11/1987 | Takazume et al. | 219/400 |
| 4,884,626 A * | 12/1989 | Filipowski | 165/231 |
| 4,902,878 A * | 2/1990 | Smith et al. | 219/486 |
| 4,973,170 A * | 11/1990 | Bescherer et al. | 374/208 |
| 5,043,547 A * | 8/1991 | Lee | 219/10.55 B |
| 5,628,242 A * | 5/1997 | Higley | 99/332 |
| 5,756,970 A * | 5/1998 | Barger et al. | 219/506 |
| 5,900,801 A | 5/1999 | Heagle et al. | |
| 5,939,974 A | 8/1999 | Heagle et al. | |
| 5,983,783 A | 11/1999 | Archard et al. | |
| 6,001,066 A | 12/1999 | Canfield et al. | |
| 6,044,804 A * | 4/2000 | Franke et al. | 122/448.1 |
| 6,068,399 A | 5/2000 | Tseng | |
| 6,080,972 A * | 6/2000 | May | 219/494 |
| 6,129,673 A * | 10/2000 | Fraden | 600/474 |
| 6,320,512 B1 * | 11/2001 | Nicholson et al. | 340/588 |
| 6,435,418 B1 * | 8/2002 | Toth et al. | 236/94 |
| 6,568,848 B1 * | 5/2003 | Chapman et al. | 374/155 |
| 6,592,253 B1 * | 7/2003 | Nyffenegger et al. | 374/143 |
| 6,617,581 B1 * | 9/2003 | Pompei | 250/349 |
| 6,623,295 B1 * | 9/2003 | DeLadurantaye, III | 439/502 |
| 6,790,178 B1 * | 9/2004 | Mault et al. | 600/300 |
| 6,817,757 B1 * | 11/2004 | Wallace | 374/120 |
| 6,881,055 B1 * | 4/2005 | Bird | 431/80 |

OTHER PUBLICATIONS

Taylor Digital Oven Thermometer/Timer, available online at: <http://www.amazon.com> on May 23, 2002.

* cited by examiner

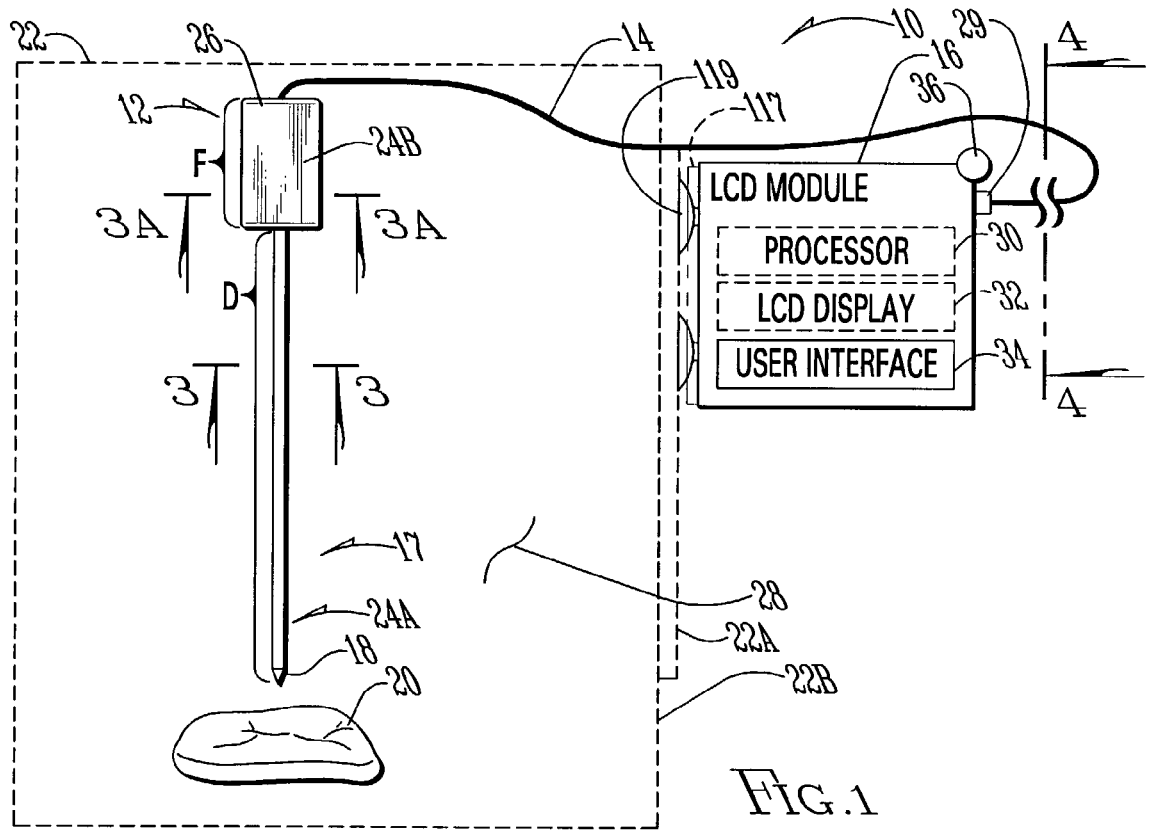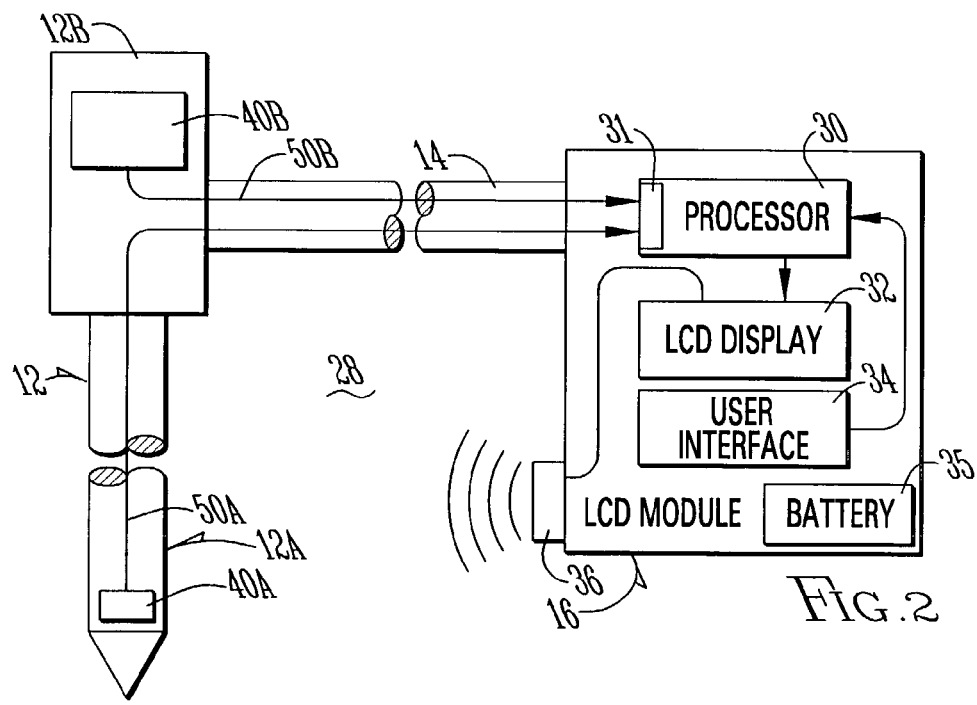

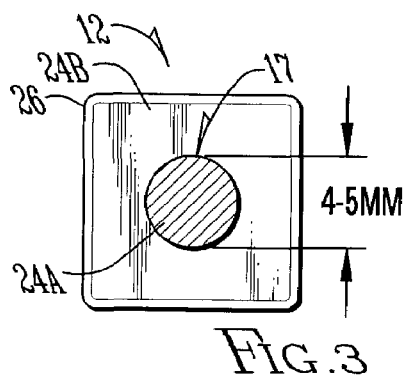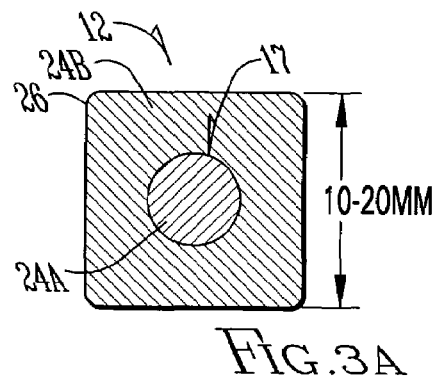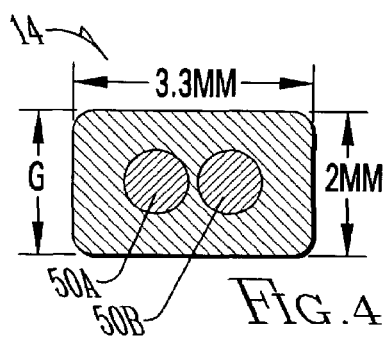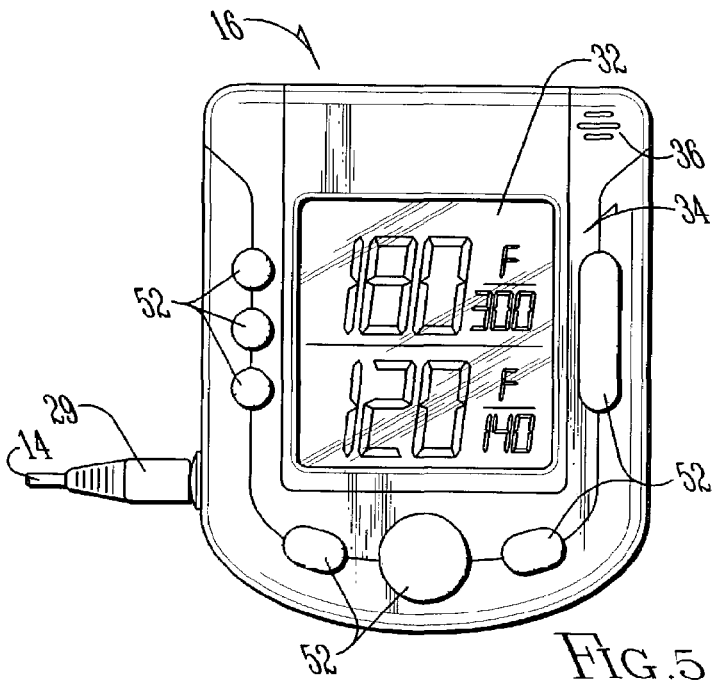

DUAL THERMOMETER SYSTEM

RELATED APPLICATIONS

This application claims priority to U.S. provisional application Ser. No. 60/304,276, filed Jul. 9, 2001, and is incorporated herein by reference.

BACKGROUND OF THE INVENTION

This invention relates generally to temperature measuring devices, and more particularly, to a thermometer system for taking temperature measurements at differing locations.

DESCRIPTION OF RELATED ART

The prior art is familiar with meat thermometers of the type that include a probe inserted into meat to determine internal cooking temperature. By way of example, the following patents, each incorporated herein by reference, exemplify various prior art meat thermometers: U.S. Pat. Nos. 6,230,649; 4,547,643; 4,475,024; 4,201,968; 4,122,322; 4,058,013; 3,991,615; and 3,975,720.

The prior art is also familiar with solid-state ovens that include controls for setting oven temperature, with basic clock timing and the like. For example, the following patents are incorporated herein by reference and provide useful background to such ovens: U.S. Pat. Nos. 4,054,778; 3,800,123; and 3,521,030.

There is a need for improved temperature control of ovens and cooking thermometers to improve safety and delivery of prepared food. Certain bacteria and disease-related anomalies may survive cooking within an oven of the prior art because a user cannot properly monitor food doneness. In conventional temperature probes, for example, one may measure meat temperature at a selected point, but fail to notice undercooked portions. Conversely, over-cooking can also occur because of inadequate temperature monitoring. The actual oven inside air temperature may be too high and can thus burn the outer layer of the cooking food; conversely, if the oven air temperature is too low, it may not cook the food to desired doneness within the original cooking time. Temperature control options associated with current solid-state ovens also do not address such food preparation issues: specifically, stated temperature readings do not adequately link to actual food doneness and temperature.

SUMMARY OF THE INVENTION

It is, accordingly, a feature of the invention to provide a thermometer that determines simultaneously the temperature of food placed within an oven and the oven air temperature. It is another feature of the present invention to provide the thermometer with sensors for measuring each of the food and oven air temperature. It is yet another feature of the present invention to provide a communications cable to transfer signals from the temperature sensors to electronics external to the oven for processing of the signals and display of temperature values. It is still another feature of the present invention to provide such a thermometer with timing and processing food doneness options for ensuring proper food preparation within the oven. It is still another feature of the present invention to provide such a thermometer that can quickly measure temperature values, is easy to operate, and particularly well suited for the proposed usages thereof.

In one aspect, the invention provides an elongated probe connected with a flexible electronic cable. The probe houses two temperature sensors—one for sensing internal food temperature, one for sensing inside oven air temperature. The sensors are spaced apart within the probe such that the one sensor can be positioned substantially within a food item and the other sensor can be positioned substantially outside of the food item and within the oven. Signals from the sensors are relayed from the probe and through the cable; external electronics may attach to the cable to acquire the signals and display associated temperatures.

In another aspect, the invention utilizes wireless transmission of sensor signals. The invention provides an elongated metal probe connected with a flexible electronic cable. The probe houses two temperature sensors—one for sensing internal food temperature, one for sensing inside oven air temperature. Signals from the sensors are relayed from the probe and through the cable to a first wireless termination. The first wireless termination wirelessly relays signals from the probe to a second wireless termination coupled to module electronics, to acquire the wireless signals and to display associated temperatures.

In operation, the probe is inserted into food within an operating oven, such that one of the sensors senses food temperature and such that the other of the sensors senses oven air temperature; the cable extends from the probe and through the door of the oven; the first wireless termination connects with the cable and resides external to the oven; the first wireless termination relays signals from the probe to the second wireless termination, coupled to the module electronics; the module electronics may be attached to a convenient location in the kitchen, usually near to the oven, to display temperatures from the probe.

The invention thus has certain advantages by accurately measuring food temperatures, and also quickly indicating actual oven inside air temperature. Specifically, with the invention, a user may monitor air and food internal temperatures during cooking to achieve the desired food doneness while avoiding over- or under-cooking of the food.

Other advantages and components of the invention are apparent from the following description taken in conjunction with the accompanying drawings, which constitute a part of this specification and wherein are set forth exemplary aspects of the present invention to illustrate various features thereof.

BRIEF DESCRIPTION OF THE DRAWINGS

FIG. 1 is a schematic drawing of the dual thermometer system according to an aspect of the present invention.

FIG. 2 is a schematic drawing of the dual thermometer system according to the aspect of FIG. 1 showing the electrical connectivity of temperature sensors with the LCD module.

FIG. 3 is a cross sectional view of the present invention taken along line 3—3 showing the distal end of the probe.

FIG. 3A is a cross sectional view of the present invention taken along line 3A—3A showing the proximal end of the probe.

FIG. 4 is a cross-sectional view of the present invention taken along line 4—4 showing the communications cable.

FIG. 5 is a top plan view of the user interface according to an aspect of the present invention.

DETAILED DESCRIPTION OF THE INVENTION

Figure 6:
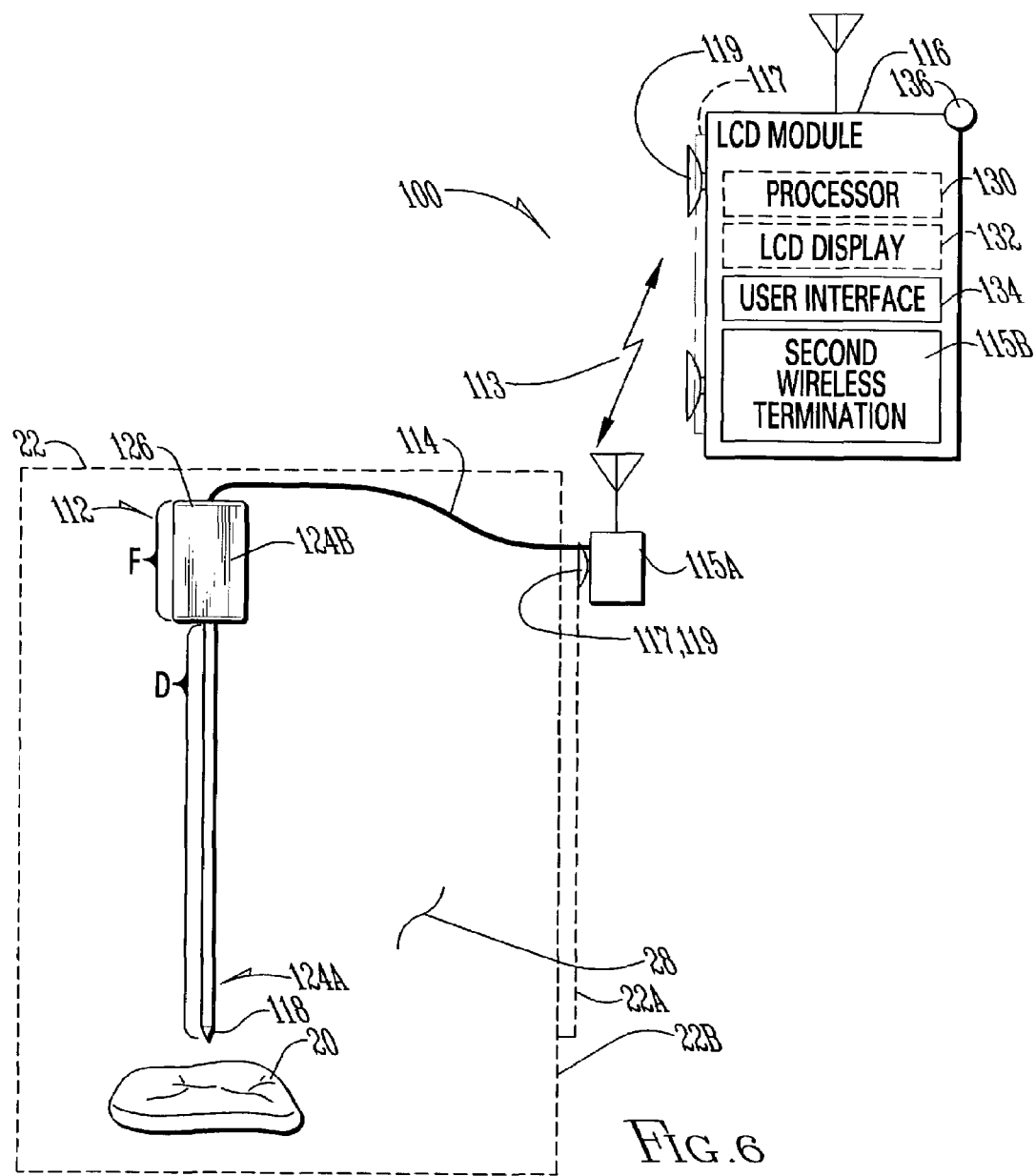
FIG. 6 is a schematic drawing of the dual thermometer system according to an aspect of the present invention showing the wireless termination.

FIG. 1 shows a dual thermometer system 10 (not to scale) constructed according to the invention. The system 10 includes an elongated probe 12, an electronics communication cable 14, and preferably, an LCD module 16 for displaying temperature data. The probe is preferably formed of stainless steel, and has a distal end 17 forming a tip 18 to facilitate piercing food 20 within an oven 22 (food 20 and oven 22 are shown without scale and only for purposes of illustration). Oven 22 is also illustratively shown with an oven door 22A and oven housing 22B.

Shown in more detail in FIG. 2, probe 12 has two temperature sensors illustratively located at locations 24A, 24B. These sensors are preferably thermistors. The temperature sensor at location 24A is arranged within the distal end 17 of the probe at or near the tip 18 so as to sense temperature of food 20; the sensor at location 24B is arranged within a proximal end forming a probe expansion section 26 to sense the temperature of oven air 28 within oven 22. The sensors at locations 24A, 24B preferably operate in a temperature range of at least 32 to 572 degrees Fahrenheit, and also preferably have a physical separation of at least 100 mm, and ideally at least 120 mm, to ensure thermal decoupling for thermally independent measurements at each sensor. As shown in FIG. 2, these temperature sensors electronically couple to signal wires that communicate temperature signals from probe 12 and through cable 14, so that LCD module 16 can capture and read the signals.

The distal end 17 of probe 12 preferably has a length D of approximately 120 mm. As shown in FIG. 3, the cross-sectional dimensions of the distal end 17 of probe 12 is typically between 4–5 mm. Probe expansion section 26 preferably has an elongated dimension F, of about 30 mm. As shown in FIG. 3A, section 26 has a preferred cross-sectional dimension of between about 10–20 mm. Section 26 may be rectangular or oval in cross-sectional shape. These probe dimensions are chosen as to provide an adequately sized housing for positioning the sensors at locations 24A, 24B therein, and also to ensure that each of the sensors may take accurate temperature measurements independent of one another.

Cable 14 connected to section 26 has a length extending to LCD module 16 of about one meter. As shown in FIG. 4, cable 14 has a preferred cross-sectional dimension of 3.2 mm×2 mm; the thinner dimension G facilitates fitting cable 14 between oven door 22A and housing 22B as the cable is extended out of the oven 22, as shown in FIG. 1. Cable 14 may also have a plug 29, such as a stereo jack, at an end thereof opposite of probe 12 to facilitate connection to LCD module.

LCD module 16 includes a processor 30 to perform calculations and control of system 10, including processing signals from the temperature sensors at locations 24A, 24B to show temperature information on a LCD display 32. A user interface 34 provides for inputting user commands such as setting desired temperatures for both food 20 and oven 22. Processor 30 preferably includes a timer, set by user inputs at user interface 34, to monitor food doneness and oven temperatures relative to desired temperatures. Power for system operation is provided by battery 35 or other suitable power source. Module 16 may further include an alarm 36, e.g., warning buzzer or LED, to warn the user of over- or under-cooking events. Additionally, module 16 may be configured to operate at up to about 140 degrees Fahrenheit such that the module can be placed in close proximity to the oven 22.

Describing the user interface 34 in more detail, a number of input buttons 52 are preferably provided to increase the functionality of the system 10, as shown in FIG. 5. Each of the input buttons 52 may perform one or more of the following functions: setting desired food and oven air temperatures, setting hour and minutes on a timer (count-up or count-down)—the duration being the total time or time elapsed at the desired food and/or oven air temperature, starting/stopping the timer, setting audio temperature alerts, toggling between Celsius and Fahrenheit temperature readings, toggling between temperature and timer displays, and turning system power on/off. For example, an input button 52 may be provided for setting one of the desired food and/or oven temperatures. Once these temperature values are reached, as measured by the sensors at locations 24a, 24b, the alarm 36 will sound and the LCD display 32 will flash on and off at a specific duration of time the actual temperature measured such that the user is notified of the current cooking situation. If the hour and minute timer is set through the input buttons 52, the alarm sounds and the LCD flashing display can also activate at the elapse of a timed event, and with various sounds and modes of flashing to distinguish from the temperature warnings. Further, the LCD display 32 may be configured to simultaneously display the desired and measured food and/or oven air temperatures, or the desired food and/or oven air temperatures and the timer.

FIG. 2 shows the detailed schematic layout of probe 12, cable 14 and LCD module 16. The temperature sensor 40A is shown at distal end 12a of probe 12; and temperature sensor 40B is shown at proximal end 12b of probe 12. Sensors 40A, 40B connect with communication wires 50A, 50B, respectively, to communicate temperature signals to LCD module processor 30. As a matter of design choice, processor 30 has an A/D converter 31 to convert the signals received from the sensors 40A, 40B to digital data. Processor 30 then converts these signals to temperatures for display on LCD display 32. Data shown on display 32 is programmed at user interface 34, as described herein.

FIG. 6 shows another aspect of an oven and food thermometer timer system 100 (not to scale) employing wireless terminations. System 100 includes an elongated probe 112, an electronics communication cable 114, a first wireless termination 115A, a second wireless termination 115B, and a LCD module 116. First wireless termination 115A wirelessly relays signals from probe 112 to second wireless termination 115B coupled to LCD module 116, to acquire the wireless signals and to display associated temperatures.

Probe 112 and cable 114 operate much like probe 12 and cable 14 of FIG. 1, with like dimensions and construction, such as shown in FIGS. 2–4. The probe 112 is preferably formed of stainless steel, and has a distal forming a tip 118 to facilitate piercing food 20 within an oven 22. As in FIG. 1, oven 22 is illustratively shown with an oven door 22A and oven housing 22B.

Probe 112 has two temperature sensors illustratively located at points 124A, 124B. These sensors are preferably thermistors as described for the aspect of the invention shown in FIG. 1. The temperature sensor at location 124A is arranged within the distal end of the probe 112 at or near the tip 118 so as to sense temperature of food 20; the sensor at location 124B is arranged within a proximal end forming a probe expansion section 126 to sense the temperature of oven air 28 within oven 22. The sensors 124A, 124B preferably have a physical separation of at least 100 mm, and ideally at least 120 mm, to ensure thermal decoupling for thermally independent measurements at each sensor.

Cable 114 connected to wireless termination 115A has a length extending to termination 115A of about one meter. Wireless termination 115A relays signals from probe 112 as wireless signals 113 to wireless termination 115B. Wireless termination 115B may be within LCD module 116, as shown, or external to module 116, as a matter of design choice.

FIG. 6 shows the LCD module 116 with the same features as the aspect of the invention shown in FIG. 1, with the addition of the wireless termination 115B such that sensor measurements are transmitted wirelessly to the LCD module. The LCD module 116 includes a processor 130 to perform calculations and control of system 100, including processing signals from the temperature sensors at locations 124A, 124B to show temperature information on a LCD display 132. A user interface 134 provides for inputting user commands such as setting desired temperatures for both food 20 and oven 22. Processor 120 preferably includes a timer, set by user inputs at user interface 134, to monitor food doneness and oven temperatures relative to desired temperatures. Module 116 may further include an alarm 136, e.g., warning buzzer or LED, to warn the user of over- or under-cooking events. Module 116 may further include features of module 16 shown in FIG. 2. In one preferred aspect, module 116 is formed as a pager such that a user of system 100 can carry the pager to receive warnings from alarm 136 as programmed through user interface 134.

Wireless termination 115A may employ a "pager like" RF transmitter, known in the art and capable of operating at up to about 140 degrees Fahrenheit. Termination 115A positioned outside the oven 22 couples to cable 114 located substantially within the oven. Thus, the cable is preferably configured to withstand temperatures of up to about 570 degrees Fahrenheit. Preferably, termination 115A transmits wireless data containing information from the probe's internal temperature sensors. Optionally, wireless termination 115A includes a LCD display to show basic temperature information within oven 20 and from one or both of the internal temperature sensors.

In the preferred aspect of the invention: cables 14, 114 of FIG. 1 and FIG. 6 are made from TEFLON-insulted wire inside a metal cable; probes 12, 112 are made from 572 degree F high temperature resistant & food-grade stainless steel; and the thermisters inside probes 12, 112 are separated by a distance of at least 100 mm to ensure precise, thermally-independent temperature measurements at two locations. The LCD module 16 of the aspect of the invention shown in FIG. 1, and the wireless termination 115A and LCD module 116 of the aspect of the invention shown in FIG. 6, may optionally have magnets 117 for mounting such elements upon a metal surface such as the oven door 22, or suction cups 119 for mounting upon a feature such as the oven door 22, a kitchen cabinet, etc., for easy and convenient viewing of temperature and timer readings.

Figure 7:
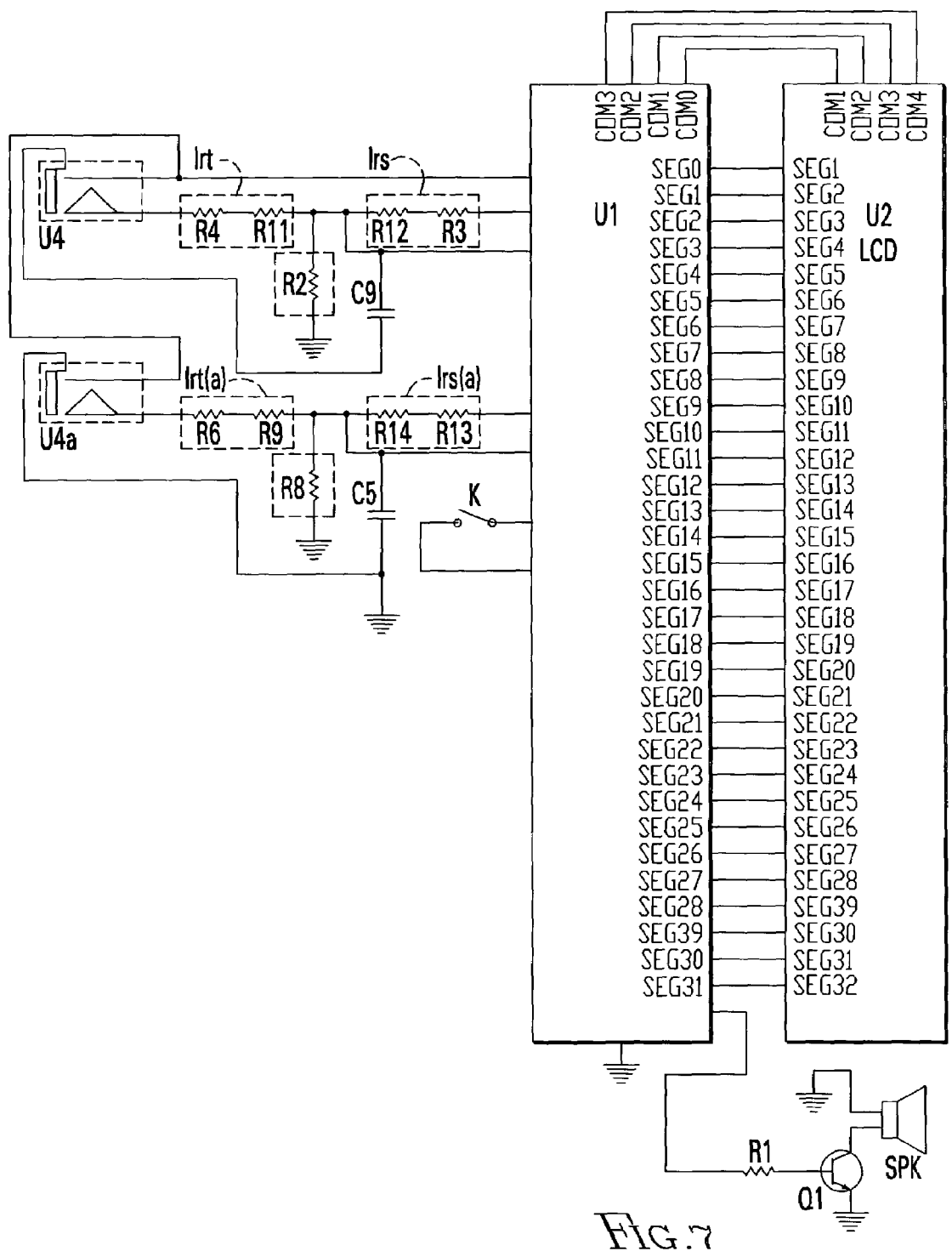
FIG. 7 is a schematic drawing of the dual thermometer system according to an aspect of the present invention showing the related circuitry.

FIG. 7 shows a schematic circuit diagram suitable for use with the electronics of the systems 10, 100 to control user inputs, temperature measurements, processing of data, and presentation of processed temperature and time data to the user in the form of audible and visual data. The two temperature sensors U4, U4a are represented as thermistors. Processor U1 directs the activity of the thermistors U4, U4a and related circuitry to take temperature readings. A/D converter 31 of FIG. 2. is preferably integrated into the processor U1. The related circuitry, shown as the resistors circuits lrt, lrt(a), lrs, and lrs(a) and capacitors C9, C5, can be formed with the thermistors in the probe 12 or located external to the oven in the LCD module 16. In the aspect of the invention of FIG. 5, wireless terminations 115A, 115B are located between the temperature sensors U4, U4a and the processor U1.

User input commands are received through user interface 34 shown at switch or input button K in FIG. 7 and connected to processor U1. Preferably, there are a number of input buttons K corresponding to setting desired food and oven air temperatures, setting hour and minutes on a timer, starting/stopping the timer, setting audio temperature alerts, toggling between Celcius and Farenheit temperature readings, toggling between temperature and timer displays, and turning system power on/off, as shown in FIG. 5.

LCD display U2 has a series of lighted segments for visually displaying temperature and timer information, and communicates with processor U1 through a series of communication lines. Alarm Q1 has a speaker for providing audible alerts relating to temperature or timer values (e.g. set food or oven temperature has been reached, count up or down timer has expired). Alternatively, such alerts could appear on the LCD display U2 as flashing lighted segments, the frequency and duration of the flashing depending on what event has occurred.

Processor U1 determines when temperature measurements should be taken, which is either at set time intervals or upon user initiation through the user interface shown in FIG. 5 at switches 52. To take a temperature reading, a series of capacitor discharge times through the thermistors U4, U4a is for example determined.

The first thermistor U4 receives a discharge of current from capacitor C9, which then travels through the resistors lrt (R4 and R11), and lrs (R2, R3, and R12) shown in FIG. 7. Discharge times $(T)rs$ and $(T)rt$ are measured and stored in the processor U1. Then, capacitor C9 is recharged and subsequently discharged through the first thermistor U4 and resistors lrt and the discharge time $(T)rt$ is again measured. Because the electrical resistance of termistor U4 is proportional to the temperature at the sensor location, processor U1 can convert the measured discharge times into a digital temperature reading of the first thermistor. This reading is then displayed on LCD display U2 as the first temperature sensor reading. The above process is self repeating such that a user is constantly updated of the current temperature measured by the temperature sensors. If the temperature value exceeds the limit of what thermistors U4, U4a can measure, the system will review previous discharge times stored by the processor U1 and convert such times to a temperature reading.

The second thermistor U4a operates in the same fashion, and simultaneously with, the first thermistor U4. The second thermistor U4a receives a discharge of current from capacitor C5, which then travels through the resistors lrt (R6 and R9), and lrs (R8, R13, and R14) shown in FIG. 7. The discharge times $(T)rs$ and $(T)rt$ are measured and stored in the processor U1. Then, the capacitor C5 is recharged and subsequently discharged through the second thermistor U4a and resistors lrt(a) and the discharge time $(T)rt$ is again measured. Like the first thermistor U4, the measured discharge times are then converted into a digital temperature reading of the second thermistor U4a. This reading is then displayed on the LCD display U2 as the second temperature sensor reading alongside the first temperature sensor reading.

The invention thus attains the features set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

What is claimed is:

1. A system for assisting food preparation of food within an oven, comprising:
    an elongated heat-resistant probe having a first temperature sensor for sensing temperature of the food and a second temperature sensor for sensing temperature of air inside the oven;
    an LCD module for positioning external to the oven and configured to accept and display a user-selectable desired food temperature; and
    an electronic communication cable for communicating signals from the first and second temperature sensors to the LCD module, wherein the LCD module processes the signals from the first temperature sensor to display an actual food temperature simultaneously with, and separately from, the user-selectable desired food temperature.

2. A system of claim 1, wherein a distal end of the probe forms a tip for inserting the probe into the food, and wherein the first temperature sensor is constructed and arranged within the distal end at or near the tip.

3. A system of claim 2, wherein the second temperature sensor is constructed and arranged within the probe at a distance of at least about 100 mm from the first temperature sensor.

4. A system of claim 1, wherein the probe is made from stainless steel.

5. A system of claim 1, wherein the first temperature sensor comprises a thermistor.

6. A system of claim 1, wherein the second temperature sensor comprises a thermistor.

7. A system of claim 1, the LCD module processing the signals from the second temperature sensor to display an actual oven air temperature with the actual food temperature.

8. A system of claim 7, wherein the LCD module comprises a user interface for selecting (a) the desired food temperature and (b) a cooking duration at the desired temperature.

9. A system of claim 8, wherein the LCD module comprises a timer for timing the cooking duration at the desired food temperature.

10. A system of claim 9, wherein the LCD module comprises an alarm, selected essentially from the group consisting of an audible alarm and a combined audible-visual alarm, for indicating completion of food cooked at the duration and at the desired food temperature.

11. A system of claim 7, wherein the LCD module comprises a user interface for selecting (a) a desired oven air temperature and (b) a cooking duration within the desired oven air temperature.

12. A system of claim 11, the LCD module configured for simultaneously and separately displaying the desired oven air temperature, set by user inputs at the LCD module, and the actual oven air temperature.

13. A system of claim 11, wherein the LCD module comprises a timer for timing the cooking duration for food within the desired oven air temperature.

14. A system of claim 13, wherein the LCD module comprises an alarm for indicating completion of food cooked at the duration and within an oven at the desired oven air temperature.

15. A system of claim 7, wherein the LCD module comprises an LCD display operable at a temperature of at least about 140 degrees F.

16. A system of claim 7, further comprising a suction cup for attaching the LCD module to a feature, wherein a user of the LCD module may place the LCD module at a convenient viewing location.

17. A system of claim 7, wherein the LCD module comprises:
    a processor for processing signals received from the first temperature sensor to compute the actual food temperature and the second temperature sensor to compute the actual oven air temperature; and
    an LCD display coupled to the processor for simultaneously displaying the actual food temperature and the actual oven air temperature.

18. A system of claim 17, the LCD module comprising a user interface for selecting the desired food temperature and a desired oven air temperature, and being configured to simultaneously display the desired food and oven air temperatures.

19. A system of claim 17, wherein the first temperature sensor comprises a thermistor, and the signals received by the processor from the thermistor comprise an electrical current discharged through the thermistor over a period of time (t), the processor computing the actual food temperature by measuring the time (t).

20. A system of claim 17, wherein the second temperature sensor comprises a thermistor, and the signals received by the processor from the thermistor comprise an electrical current discharged through the thermistor over a period of time (t), the processor computing the actual oven air temperature by measuring the time (t).

21. A system of claim 7, the LCD module comprising first and second LCD display portions, the first LCD display portion showing the actual food temperature, the second LCD display portion showing the actual oven air temperature.

22. A system of claim 21, wherein the first LCD display portion further shows the desired food temperature, as set by inputs from a user of the LCD module.

23. A system of claim 22, wherein the second LCD display portion further shows desired oven air temperature, as set by inputs from a user of the LCD module.

24. A system of claim 1, wherein the probe is constructed and arranged to operate at a temperature of up to about 572 degrees F.

25. A system of claim 1, further comprising a plug for connecting the cable to the LCD module.

26. A system of claim 25, wherein the plug comprises a stereo jack.

27. A system of claim 1, wherein the cable has a substantially flat cross-sectional diameter to facilitate closing an oven door adjacent to the cable, wherein the cable extends from the probe within the oven to a location external to the oven.

28. A system of claim 27, wherein cross-sectional dimensions of the cable are about 3 mm by 2 mm.

29. A system of claim 1, wherein the cable has a length of about one meter.

30. A system of claim 1, wherein the probe has a cross-sectional diameter of four to about five millimeters.

31. A system of claim 1, wherein a proximal end of the probe comprises a probe expansion section housing the second temperature sensor, and wherein a distal end of the probe houses the first temperature sensor, the probe expansion section having a cross-sectional diameter larger than a cross-sectional diameter of the distal end of the probe.

32. A system of claim 31, wherein the probe expansion section has a cross-sectional diameter of between about ten and twenty millimeters.

33. A system of claim 31, wherein the probe is constructed and arranged with the distal end forming a tip for insertion into food and with an elongated distance between the tip and the probe expansion section of about 120 mm.

34. A system of claim 31, wherein the cable couples with the probe expansion section.

35. A system of claim 31, wherein the distal end of the probe has a cross-sectional diameter of about 4 mm, and the probe expansion section has a cross-sectional diameter of about 12 mm.

36. A system of claim 1, wherein the system further comprises a first wireless transmission module connected to the cable and arranged externally to the oven, the cable communicating signals from the first and second temperature sensors to the first wireless transmission module and along a pathway passing adjacent to an oven door of the oven, the first wireless transmission module communicating signals from the cable to a remote receiver as wireless data.

37. A system of claim 36, the LCD module comprising the remote receiver and having a second wireless transmission module for receiving the wireless data, the LCD module processing the data to display the actual food temperature from the first temperature sensor and oven air temperature from the second temperature sensor.

38. A system of claim 37, wherein the LCD module comprises a user interface for selecting (a) the desired food temperature and (b) a cooking duration at the desired food temperature.

39. A system of claim 38, wherein the LCD module comprises a timer for timing the cooking duration at the desired food temperature.

40. A system of claim 39, wherein the LCD module comprises an alarm for indicating completion of food cooked at the duration and at the desired food temperature.

41. A system of claim 38, wherein the LCD module comprises a user interface for selecting (a) a desired oven air temperature and (b) a cooking duration within the desired oven air temperature.

42. A system of claim 41, wherein the LCD module simultaneously displays the desired oven air temperature, set by user inputs at the LCD module, and actual oven air temperature as determined by the second temperature sensor.

43. A system of claim 42, wherein the LCD module comprises a timer for timing the cooking duration for food within the desired oven air temperature.

44. A system of claim 43, wherein the LCD module comprises an alarm, selected essentially from the group consisting of an audible alarm and a combined audible-visual alarm, for indicating completion of food cooked at the duration and within an oven at the desired oven air temperature.

45. A system of claim 38, the LCD module comprising an LCD display having an operating temperature of at least about 140 degrees F.

46. A system of claim 38, further comprising a suction cup for attaching the LCD module to a feature.

47. A system of claim 38, wherein the LCD module has first and second LCD display portions, the first LCD display portion showing the actual food temperature, the second LCD display portion showing oven air temperature.

48. A system of claim 47, wherein the first LCD display portion further shows the desired food temperature, as set by inputs from a user of the LCD module.

49. A system of claim 47, wherein the second LCD display portion further shows desired oven air temperature, as set by inputs from a user of the LCD module.

* * * * *